United States Patent [19]
Moroto et al.

[11] Patent Number: 5,357,820
[45] Date of Patent: Oct. 25, 1994

[54] SHIFT CONTROL SYSTEM FOR AUTOMATIC VEHICLE TRANSMISSION

[75] Inventors: Shuzo Moroto, Nagoya; Takeshi Inuzuka; Masashi Hattori, both of Anjo, all of Japan

[73] Assignee: Aisin Aw Co., Ltd., Japan

[21] Appl. No.: 92,421

[22] Filed: Jul. 16, 1993

[30] Foreign Application Priority Data

Jul. 22, 1992 [JP] Japan .................................. 4-215760

[51] Int. Cl.⁵ .............................................. F16H 59/04
[52] U.S. Cl. ...................... 74/335; 74/473 R; 74/625
[58] Field of Search ................ 74/335, 473 R, 625

[56] References Cited

U.S. PATENT DOCUMENTS

5,056,376  10/1991  Moroto et al. ........................ 74/335

FOREIGN PATENT DOCUMENTS

58-105828  6/1983  Japan .
4-119262   4/1992  Japan .
4-272570   9/1992  Japan .

*Primary Examiner*—Allan D. Herrmann
*Attorney, Agent, or Firm*—Lorusso & Loud

[57] ABSTRACT

In a linkage through which a manual selector is connected to a manual valve are a power unit and a connecting/disconnecting mechanism. In "P", "R", and "N", the connecting/disconnecting mechanism is connected and the power unit is made inoperative, whereby a movement of the manual selector is mechanically transmitted directly to the manual valve. In other shifts including manual shifts, the connecting/disconnecting mechanism is disconnected and the manual valve is operated directly by the power unit in accordance with positions of the selector lever.

12 Claims, 9 Drawing Sheets

| Position | | Solenoid | | | | Clutch | | | Brake | | | | One-way clutch | | |
|---|---|---|---|---|---|---|---|---|---|---|---|---|---|---|---|
| | | No.1 | No.2 | SLU (No.3) | SLN (No.4) | C1 | C2 | C0 | B1 | B2 | B3 | B0 | F1 | F2 | F0 |
| P | | O⊗ | × | × | | × | × | O | × | × | × | × | × | × | × |
| R | | O⊗ | × | × | | × | O | O | × | × | O | × | × | × | O |
| R(V≧9) | | O⊗ | O | × | | × | × | O | × | × | × | × | × | × | O |
| N | | O⊗ | × | × | | × | × | O | × | × | × | × | × | × | × |
| D | 1ST | O | × | × | | O | × | O | × | × | × | × | × | × | O |
| | 2ND | O | O | ◎ | | O | × | O | × | O | × | × | ⊗ | × | O |
| | 3RD | × | O | ◎ | | O | O | O | × | O | × | × | × | × | O |
| | 4TH | × | × | ◎ | | O | O | × | × | O | × | O | × | × | × |
| S | 1ST | O | × | × | | O | × | O | × | × | × | × | × | ⊗ | O |
| | 2ND | O | O | × | | O | × | O | O | × | × | × | O | × | O |
| | 3RD | × | O | ◎ | | O | O | O | × | O | × | × | × | × | O |
| | (3RD) | × | × | × | | O | O | O | × | O | × | × | × | × | O |
| L | 1ST | O | × | × | | O | × | O | O | × | O | × | O | O | O |
| | 2ND | O | O | × | | O | × | O | O | O | × | × | × | × | O |
| | (1ST) | × | × | × | | O | × | O | × | × | O | × | × | O | O |

| Remarks | | | |
|---|---|---|---|
| O | On | Engaged | Locked |
| × | Off | Released | Free |
| ◎ | On when locked up Off when lockup is released | — | — |
| ⊗ | — | — | Free during coast |

FIG. 8

FIG. 11A1 FIG. 11A2
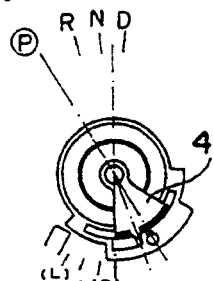 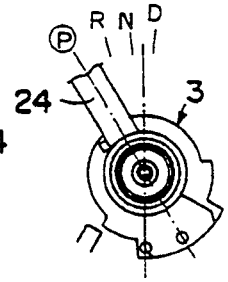 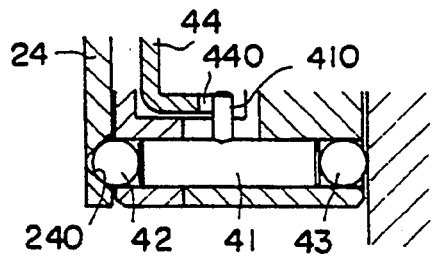
FIG. 11B1 FIG. 11B2 FIG. 11A3
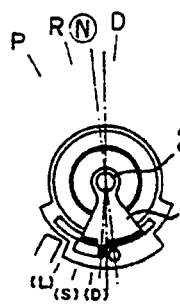 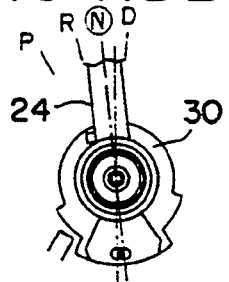
FIG. 11C1 FIG. 11C2 FIG. 11C3
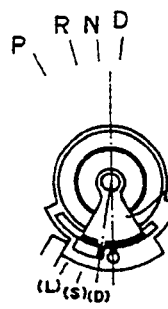 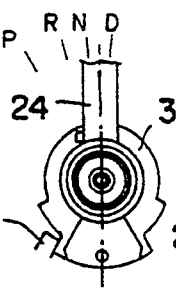 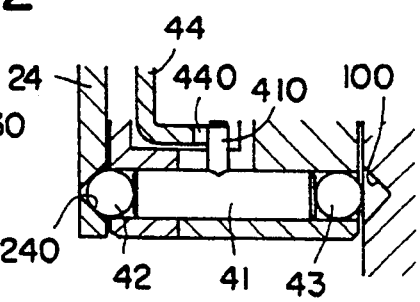
FIG. 11D1 FIG. 11D2 FIG. 11D3
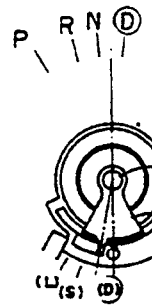 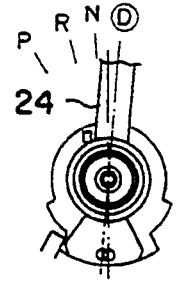 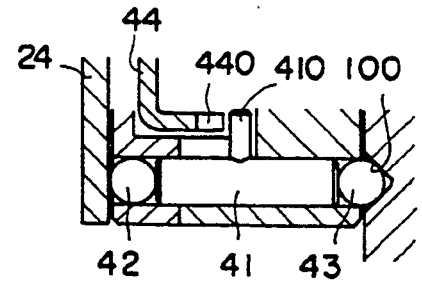
FIG. 11E1 FIG. 11E2
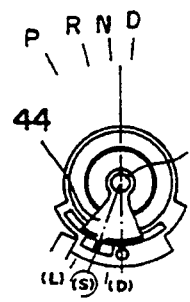 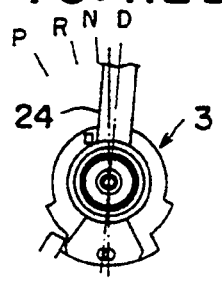

SHIFT CONTROL SYSTEM FOR AUTOMATIC VEHICLE TRANSMISSION

BACKGROUND OF THE INVENTION

1. Field of the Invention

This invention relates to a shift control system for an automatic transmission, and especially to a shift control system permitting both automatic range shifting and manual shifting of an automatic transmission.

2. Description of the Related Art

Various approaches have been proposed recently to permit a manual shift while using the speed-change mechanism of an automatic transmission without modification. One such approach is the shift range change-over mechanism for a vehicular automatic transmission developed by the present assignee and disclosed in Japanese Patent Application Laid-Open (Kokai) No. HEI 4-119262. In this prior art device the gear shift pattern of the shift control unit of range change-over mechanism is in the form of a combination of the conventional "I" and "H" gear shift patterns. The conventional "I" gear shift pattern includes various positions such as parking (hereinafter called "P"), reverse (hereinafter called "R"), neutral (hereinafter called "N"), drive (hereinafter called "D"), second (hereinafter called "S") in which an engine brake can be applied on a mountain road or the like and low (hereinafter called "L"), which are all arranged linearly. In the conventional "H" gear shift pattern the "1st" to "4th" speed positions are respectively arranged at the free ends of the "H" pattern.

Selection of a desired range by automatic shifting with the above mechanism is effected by moving a selector lever along a first shifting path on the "I" pattern, while a manual shift is effected by moving the selector lever to a second shifting path extending in parallel with the first shifting path and then moving the selector lever along the second shifting path. These movements of the selector lever are each converted via a mechanical displacement transmission mechanism to a corresponding linear shift of a manual valve in a hydraulic servo control circuit.

In such a manual gear shift pattern, with a view to effectively applying engine brakes conforming with the respective gear positions, "L", "S" and "D" positions of the manual valve are designed to correspond to the "1st" speed, the "2nd" and "3rd" speeds and the "4th" speed, respectively. A link mechanism converts movement of the selector lever to a desired speed position, to a linear shift of the manual valve in the same direction as the lever movement or in the direction opposite thereto. This inevitability leads to complication of the mechanical displacement transmission mechanism so that a large force is required for use of the selector lever. This is certainly against the principle of manual shift control which requires light, smooth and easy operability. While the leverage of the displacement transmission mechanism can be increased to reduce the force required for operating the selector lever, this creates other problems in that the mechanism becomes larger and its adaptability to mounting on a vehicle is decreased.

While the respective positions of the selector lever might be detected electrically, instead of using the mechanical displacement transmission mechanism, with the manual valve driven by a step motor or the like in accordance with electrical signals corresponding to the respective positions, in view of the fact that a large force is required to release the selector lever from its engagement with a parking pawl upon shifting from the "P" position to another gear position, it is difficult to achieve the shifting of the manual valve to all the positions by the step motor alone. Moveover, such an approach would require a large step motor, thereby creating similar problems as in the aforementioned approach.

SUMMARY OF THE INVENTION

With the foregoing in view, an object of the present invention is to provide a shift control system for a vehicle automatic transmission, which system mechanically performs at least each position shift in automatic shifting operation, said position shifts requiring large operating power, while for other position shifts, especially shifts between manual speed-change positions, the mechanical connection between the selector lever and the manual valve is released and, instead, each position is electrically detected to operate the manual valve by a separate power unit, whereby a light and smooth manual shift is feasible without the need for an enlargement of the mechanism.

To attain the above objects, the present invention provides a shift control system for operating a manual valve assembled in an automatic transmission to perform a range shift or a manual shift of said automatic transmission comprising:

a selector lever operable by a driver;

an outer lever connected to said selector lever and turnable responsive to a movement of said selector lever;

a manual shaft connected to said manual valve and turnable responsive to the movement of said selector lever;

a power unit for turning said manual shaft;

a connecting/disconnecting mechanism for establishing connection or disconnection between said outer lever and said manual shaft;

sensors for detecting respective shift positions of said selector lever on said shifting operation device;

an electronic control unit for actuating said power unit in response to a signal from said sensors:

said power unit having a power unit casing supported on a transmission case, a rotor portion disposed inside said power unit casing and fixed on said manual shaft, and a stator portion arranged inside of and fixed on said power unit casing and adapted to rotate said rotor portion in response to a signal from said electronic control unit; and said connecting/disconnecting mechanism switching, in accordance with the movement of said selector lever, between an operating force transmitting position, where said connecting/disconnecting mechanism connects said manual shaft and said outer lever to each other and leaves said power unit casing rotatable relative to said transmission case, and an operating force cut-off position where said connecting/disconnecting mechanism disconnects said manual shaft and said outer lever from each other and fixes said power unit casing against rotation relative to said transmission case.

According to the above-described shift control system of the present invention, upon movement of the selector lever between gear positions, which movement requires a large operating force, the rotor portion and the power unit casing are connected by the connecting- /disconnecting mechanism to mechanically determine the position of the manual valve, i.e., a position corresponding to the position of the selector lever. Upon movement of the selector lever between other positions, the connection between the rotor portion and the power unit casing is released by the connecting/disconnecting mechanism so that the manual valve is operated by actuating the power unit.

As is understood from the foregoing, drive of the manual valve is mechanically performed upon selection of some of the shift positions by the selector lever and the manual valve is driven by an independent power source upon selection of the remaining shift positions. The present invention has therefore made it possible to achieve both range shifts and manual shift control of an automatic transmission by a compact shift control system of simple design. Owing to the combination of avoidance of a complicated mechanism and a reduction in operating power by the adoption of the separate, independent power unit, the present invention can provide a shift control system which permits light and smooth manual shift control.

BRIEF DESCRIPTION OF THE DRAWINGS

The above and other objects, features and advantages of the present invention will become apparent from the following description and the appended claims, taken in conjunction with the accompanying drawings, in which:

FIG. 8 is a shift diagram table illustrating operation of the automatic transmission;

FIGS. 11A1 to 11A3, 11B1, 11B2, 11C1 to 11C3, 11D1 to 11D3, 11E1 and 11E2 illustrate operation of the power unit with a built-in connecting/disconnecting mechanism.

DETAILED DESCRIPTION OF THE INVENTION AND PREFERRED EMBODIMENT

Figure 1:
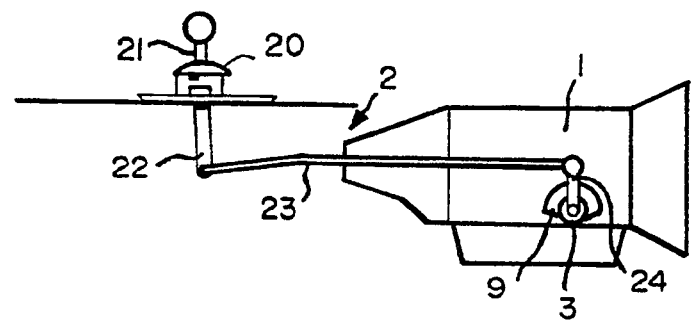
FIG. 1 is a schematic side view of a shift control system according to one embodiment of the present invention.
Figure 2:
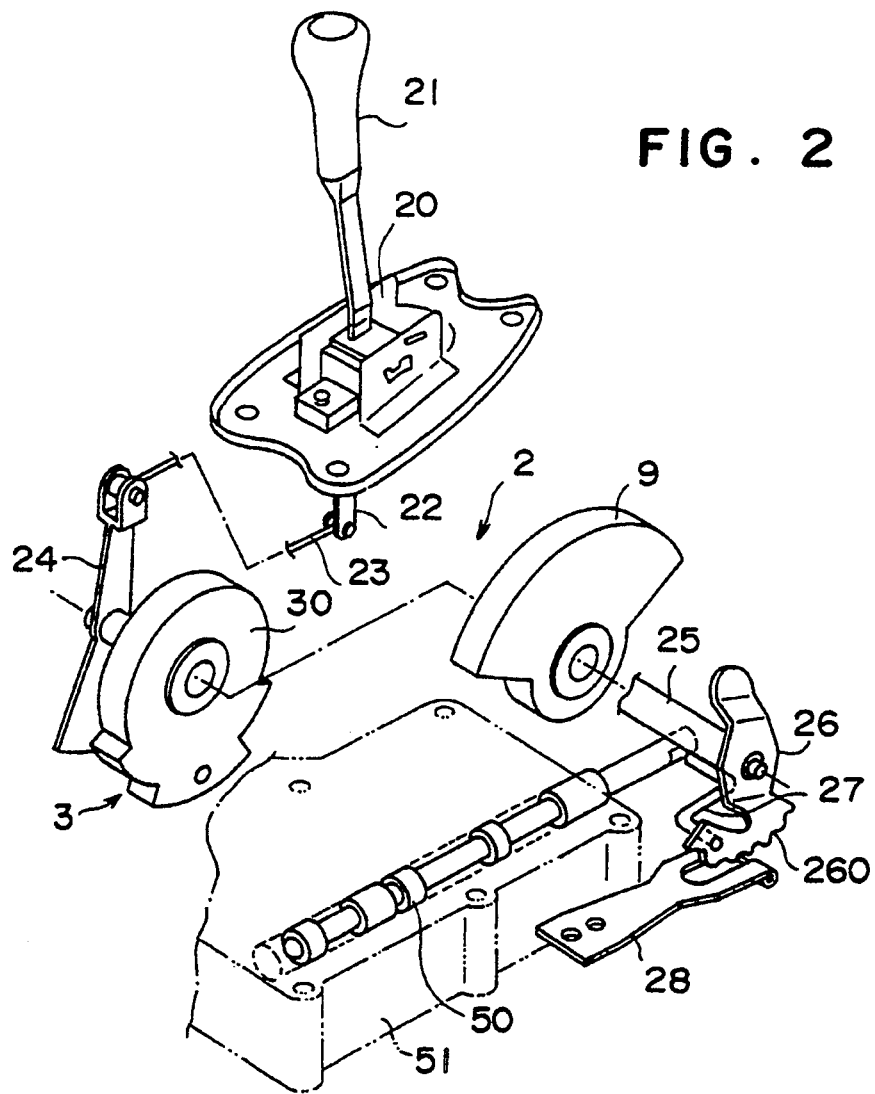
FIG. 2 is a developed perspective view of the shift control system of FIG. 1, illustrating its mechanical linkage.
Figure 3:
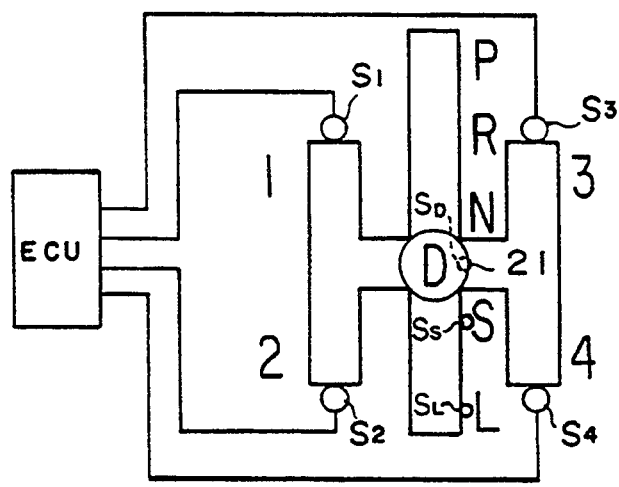
FIG. 3 is a plan view showing a shift gear pattern of the shift control system and the arrangement of switches.

One embodiment of the present invention will hereinafter be described with reference to the accompanying drawings. Describing the overall construction first, as shown in FIGS. 1-3, a shift control system 2 operates a manual valve 50 of an automatic transmission 1 mounted on a vehicle, to perform range change-over and manual shift control of the automatic transmission 1. The shift control system 2 includes a selector lever 21 arranged in a shift control unit 20, an operation link 22, 23 connecting the shift lever 21 to the manual valve 50, a power unit 3 inserted in the operation link, a connecting/disconnecting mechanism 4 (FIG. 4) for connecting the power unit to the operation link 22, 23 or disconnecting the former from the latter, sensors $S1$-$S4$, $S_D$, $S_{DD}$, $S_L$ (FIG. 3) for detecting positions of the shift lever 21 on the shift control unit 20, and an electronic control unit (ECU) for actuating the power unit 3 in response to signals from the sensors. The operation link, in turn, includes a control arm 22, a control rod 23, an outer lever 24, a manual shaft 25, a detent lever 26 and a rod 27, as will be described subsequently herein. Further, numeral 9 indicates a neutral start switch which has conventionally been used in an automatic transmission to detect the position of the selector lever.

Figure 4:
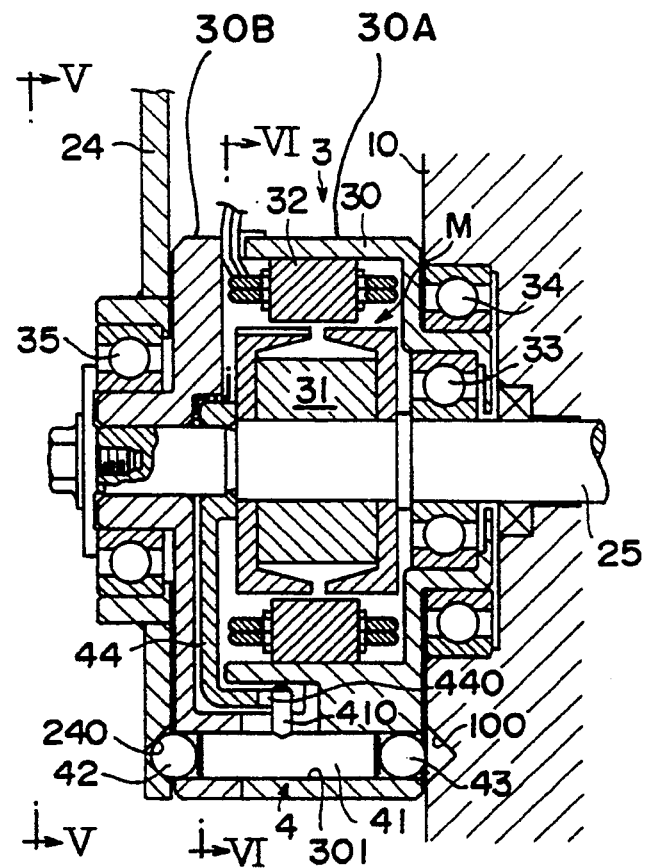
FIG. 4 is an axial cross-sectional view showing details of a power unit.
Figure 5:
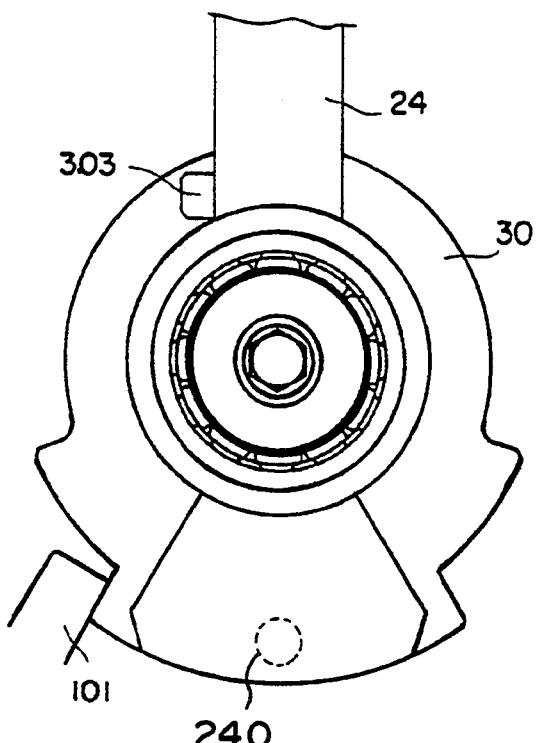
FIG. 5 is a cross-sectional view taken along V—V in FIG. 4.
Figure 6:
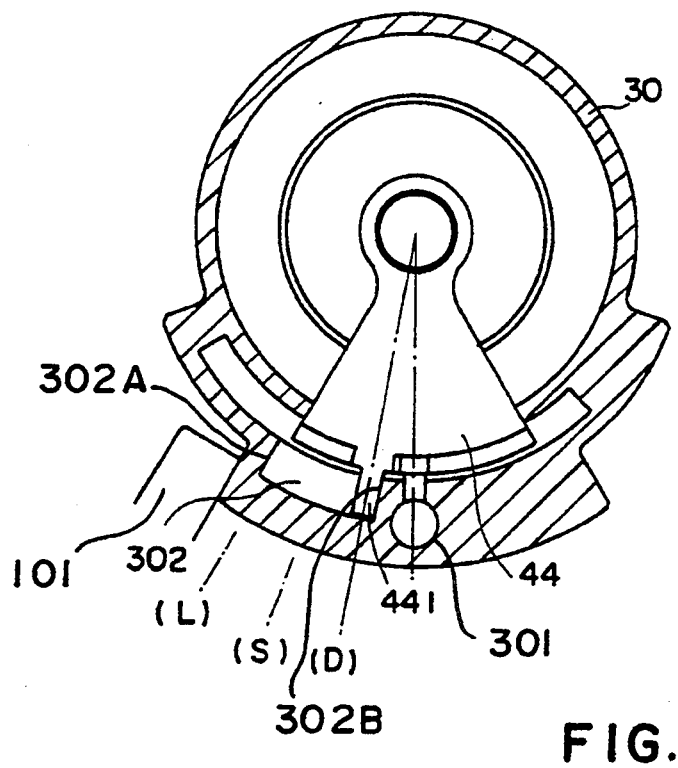
FIG. 6 is a cross-sectional view taken along VI—VI of FIG. 4.

As is illustrated in FIGS. 4 to 6, the power unit 3 is provided with a power unit casing (will be referred to as "the motor casing" in the subsequent description of the embodiment) 30 and a rotor portion (will also be referred to as "the rotor" in the subsequent description of the embodiment) 31 accommodated inside the motor casing 30. The connecting/disconnecting mechanism 4 has change-over means (which includes a spacer 41 as a lock member and a pair of balls 42,43, all to be described subsequently herein) which is displaceable responsive to movement of the operation link between an operating force transmitting position (the position illustrated in the drawings) and an operating force cut-off position. In the operating force cut-off position the change-over means connects the rotor 31 and the motor casing 30 together and leaves the motor casing 30 turnable relative to a transmission case 10. In the operating force cut-off position the change-over means cuts off the connection between the rotor 31 and the motor casing 30 and fixes the motor casing 30 against turning (rotation) relative to the transmission case 10.

Although a description of the detailed construction of the shift control unit 20 depicted in FIGS. 1 to 3 is omitted herein, the shift control unit 20 in the illustrated embodiment is designed so that when the selector lever 21 moves along the "I" gear shift pattern, the selector lever 21 and the control arm 22 are connected together but when they move in the "H" gear shift pattern, the connection is released and the control arm 22 is immovably locked. Accordingly, movement of the selector lever 21 along the "I" gear shift pattern is transmitted as a mechanical displacement to the control arm 22 but no other movement of the selector lever 21 is so transmitted.

On one side of the power unit 3, the outer lever 24 is turnably supported on the motor casing 30 as shown in FIG. 2. The detent lever 26 is mounted on one end of the manual shaft 25 which constitutes the output shaft of the power unit 3, and the detent lever 26 is connected via the rod 27 to the manual valve 50 which linearly slides within a valve body 51. In a peripheral wall of the detent lever 26, a plurality of cam notches 260 are formed corresponding to the respective positions on the "I" gear shift pattern. An operating end of a detent spring 28 is brought into these cam notches.

The selector lever 21 is operated along a gear shift pattern shown in FIG. 3. By movement of the selector lever 21 between the respective positions P, R, N, D, S and L arranged in the form of letter "I" the automatic transmission is operated as a conventional automatic transmission in a conventional manner. On the other hand, manual shift control is performed by moving the selector lever 21 along an "H" pattern arranged in an overlapped relationship with the "I" shift pattern. As a result, the position of the selector lever 21 is electrically detected by the "1st" to "4th" speed sensors S1–S4 (for example, limit switches separately arranged at the individual positions or a slide switch movable in association with the selector lever) as one of the first to fourth speed positions, and a detection signal is then inputted to an electronic control unit (ECU).

As shown in detail in FIGS. 4 to 6, the motor casing 30 of the power unit 3 is axially divided into two parts. One of the two parts 30A is rotatably supported on the transmission case 10 via two bearings, 33,34 arranged in a coaxial relationship, while the other part 30B rotatably supports the outer lever 24 thereon via a bearing 35. A motor M is mounted inside the motor casing 30 and includes rotor 31 disposed for rotation inside a stator 32 around which a coil is wound. The rotor 31 is fixedly mounted on the manual shaft 25 which, in turn, is rotatably supported in the motor casing 30.

Formed in an outer peripheral thick portion (i.e., a lower portion as viewed in the drawings) of the motor casing 30 is a through-hole 301 which extends in parallel with the axis of the manual shaft 25. The spacer 41 with a stopper pin 410 protruding therefrom and the paired balls 42,43, maintained in contact with the opposing end faces of the spacer 41, respectively, are slidably contained in the through-hole 301. A sector-shaped detent in the outer lever 24 defines an inwardly-open, conical, ball-fixing recess 240 in which the outer ball 42 can be received. It is to be noted that the term "outer" and "inner" as used herein indicate positions relative to the transmission case 10. The transmission case 10 has an outwardly-open, conical, ball-fixing recess 100 in which the inner ball 43 is received when the outer lever 24 is located between the "N" gear position and the "D" gear position (this state will hereinafter be called "the transition state").

A sector-shaped rotor stopper 44, with an arc portion bent in the axial direction, is integrally mounted on the manual shaft 25. A turned square, U-shaped notch is inwardly formed in the bent portion to provide a stopper-pin-engaging portion 440 in which the stopper pin is received. An overstroke-preventing pin 441 is also provided on the arc portion of the rotor stopper 44 as shown in FIG. 6. This overstroke-preventing pin 441 is maintained in engagement with a groove 302 formed in the motor casing 30 so that the range of turning motion of the rotor stopper 44 is limited by end faces or stops 302A and 302B. Incidentally, numeral 303 in FIG. 5 designates a stopper provided on and extending from the motor case 30 so that the stopper 303 is brought into contact with the outer lever 24.

The paired, inner and outer balls 42,43, the spacer 41, the stopper pin 410 and the rotor stopper 44 make up the connecting/disconnecting mechanism. When the outer lever 24 is turned clockwise as viewed in FIG. 5 from the "P" gear position to the "R" and further to the "N" position, the outer lever 24 and the motor casing 30 are connected via the ball 42 and turn clockwise as an integral unit whereby the manual shaft 25 also turns clockwise via the stopper pin 410 and the rotor stopper 44. As a result, a connected state is established in which turning motion of the outer lever 24 is transmitted to the manual shaft 25.

When the outer lever 24 is moved to the position of the transition state, however, the motor casing 30, turns integrally with the outer lever 24 until that point where it is prevented by a stopper 101 provided on the transmission case 10 from any further clockwise turning motion toward the "D" gear position. This position is designed to be the position where the inner ball 43 is aligned with the ball-fixing recess 100 on the side of the transmission case 10, thereby releasing the support of the ball 43 by a reaction force from the transmission case 10. Therefore, relative turning motion then occurs therebetween and the outer ball 42 is pushed inwardly by the outer lever 24 to push the spacer 41 and the inner ball 43 toward the transmission case 10. The ball 43 is brought into engagement with the ball-fixing recess 100 on the side of the transmission case while the ball 42 is released from its engagement with the ball-fixing recess 240 on the side of the outer lever 24. As a result, the two balls 42,43 and the spacer 41 move inwardly together. At this time, the stopper pin 410 also moves inwardly so that the stopper pin 410 is disengaged from the turned square U-shaped, stopper-pin-engaging portion 440 of the rotor stopper 44. The manual shaft 25 is brought into a state cut off from the outer lever 24, thereby making it possible to independently turn the manual shaft 25 by external force.

Figure 7:
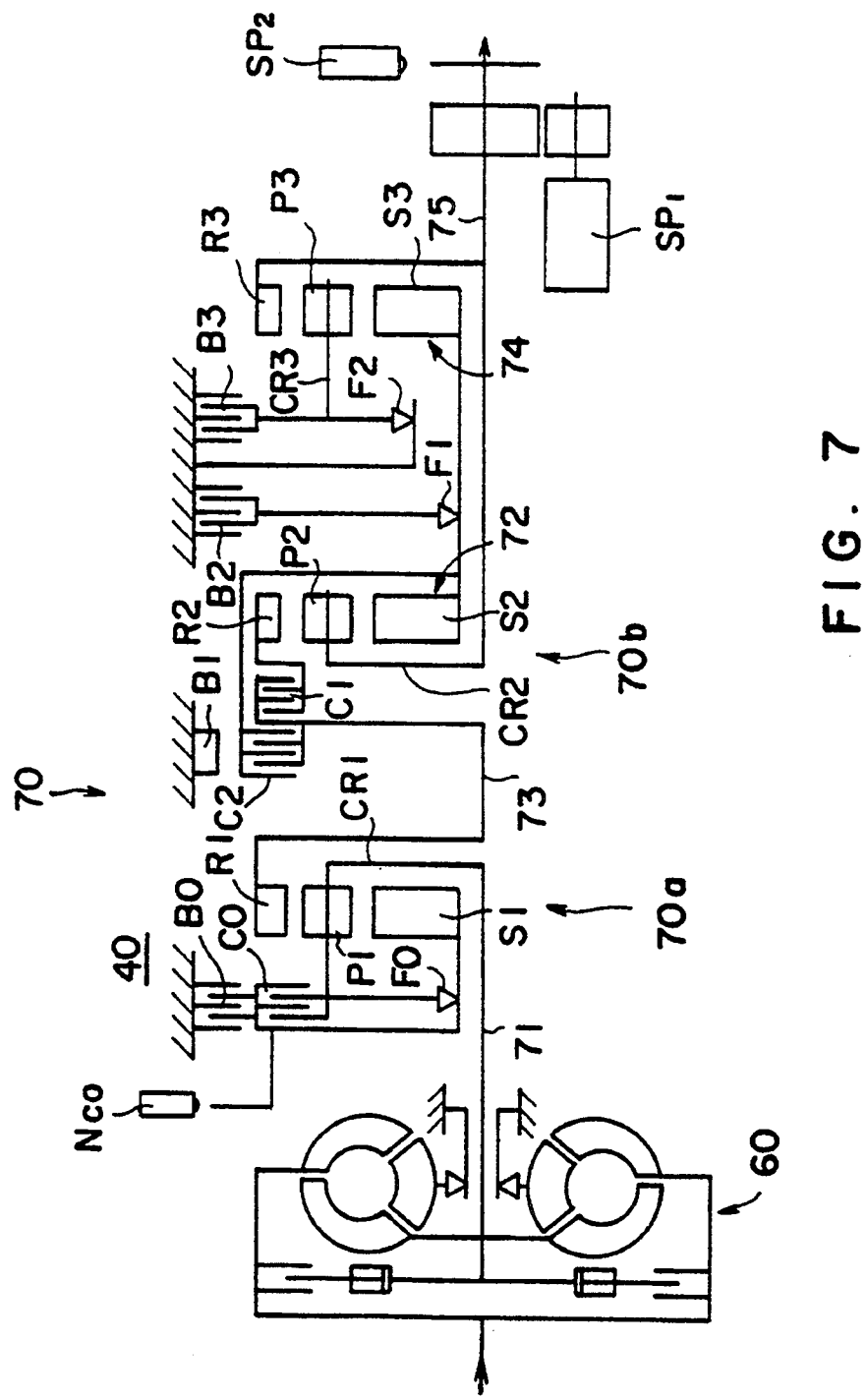
FIG. 7 is a schematic skeleton diagram showing a shift gear mechanism of an automatic transmission to which the present invention can be applied.

FIG. 7 illustrates one example of an automatic transmission which can be controlled by the shift control-system of the present invention. This illustrated transmission includes a torque converter 60 having a lockup clutch, a planetary speed-change gear mechanism 70, and a hydraulic control system therefor. The hydraulic control system will be described subsequently herein. The speed-change gear mechanism 70 includes an overdrive planetary gear unit 70a and a main speed-change unit 70b. The speed-change unit 70b, in turn, includes a front planetary gear unit 72 and a rear planetary gear unit 74.

The overdrive planetary gear unit 70a is provided with a carrier CR1 connected to an input shaft 71 and supporting the planetary pinion P1 thereon, a sun gear S1 fitted on the input shaft 71, and a ring gear R1 connected to an input shaft 73 of the main speed-change unit 70b. Interposed between the carrier CR1 and the sun gear S1 are an overdrive direct clutch C0 and a one-way clutch F0. An overdrive brake B0 is disposed between the clutch C0 and transmission case 40.

The front planetary gear unit 72 includes a carrier CR2 connected to an output shaft 75 and supporting a planetary pinion P2 thereon, a sun gear S2 fitted on the output shaft 7S and constructed integrally with a sun gear S3 of the rear planetary unit 74, and a ring gear R2 connected to the input shaft 73 via a clutch C1. A direct clutch C2 is interposed between the input shaft 73 and the sun gear S2. Between the sun gear S2 and the transmission case 40, a second coaster brake B1 and a multiple-disk coaster brake B2 are disposed in parallel with each other, with a one-way clutch F1 being interposed therebetween.

The rear planetary gear unit 74 includes a carrier CR3 supporting a planetary pinion P3 thereon, a ring gear R3 connected to the output shaft 75, and a sun gear S3 integral with the sun gear S2. Between the carrier CR3 and the transmission case 40, a first and reverse brake B3 and a one-way clutch F2 are disposed in parallel with each other. Regarding operation of the automatic transmission, reference is made to the shift diagram table shown in FIG. 8 instead of description here.

The hydraulic control system, for this transmission (not illustrated in the drawings), controls hydraulic servomotors for the respective clutches C0 to C2 and hydraulic servomotors for the individual brakes B0 to B3, all shown in FIG. 7. Oil pressure delivered from a hydraulic pump is guided to the manual valve 50 shown in FIG. 12 through an input port PL by way of a main line and is fed to respective shift valves through corresponding output ports a,b,c,r, which are selectively opened by changing over the manual valve 50. Each shift valve controls the hydraulic pressure of the corresponding hydraulic servomotor by opening or closing an associated solenoid valve which is electromagnetically driven. The feed hydraulic pressure is regulated by feeding a throttle pressure, which has been output from a throttle valve, through a primary regulator valve and a secondary regulator valve, so that the hydraulic pressure of the main line can be regulated in accordance with the opening of the throttle valve.

As shown in the shift diagram table of FIG. 8, the shift ratios in the respective ranges of the automatic transmission are hence automatically selected by controlling the engagement or release of the individual clutches C0 to C2 and brakes B0 to B3 and also engaging or releasing the one-way clutches F0 to F2 in accordance with combinations of servo pressures. The servo pressures correspond to the respective positions of the spool of the manual valve 50 and vary depending on the ranges, and signals applied to solenoids No. 1 and No. 2 in the hydraulic circuit, in accordance with the vehicle speeds and throttle openings in the running ranges other than "P" and "N".

Figure 9:
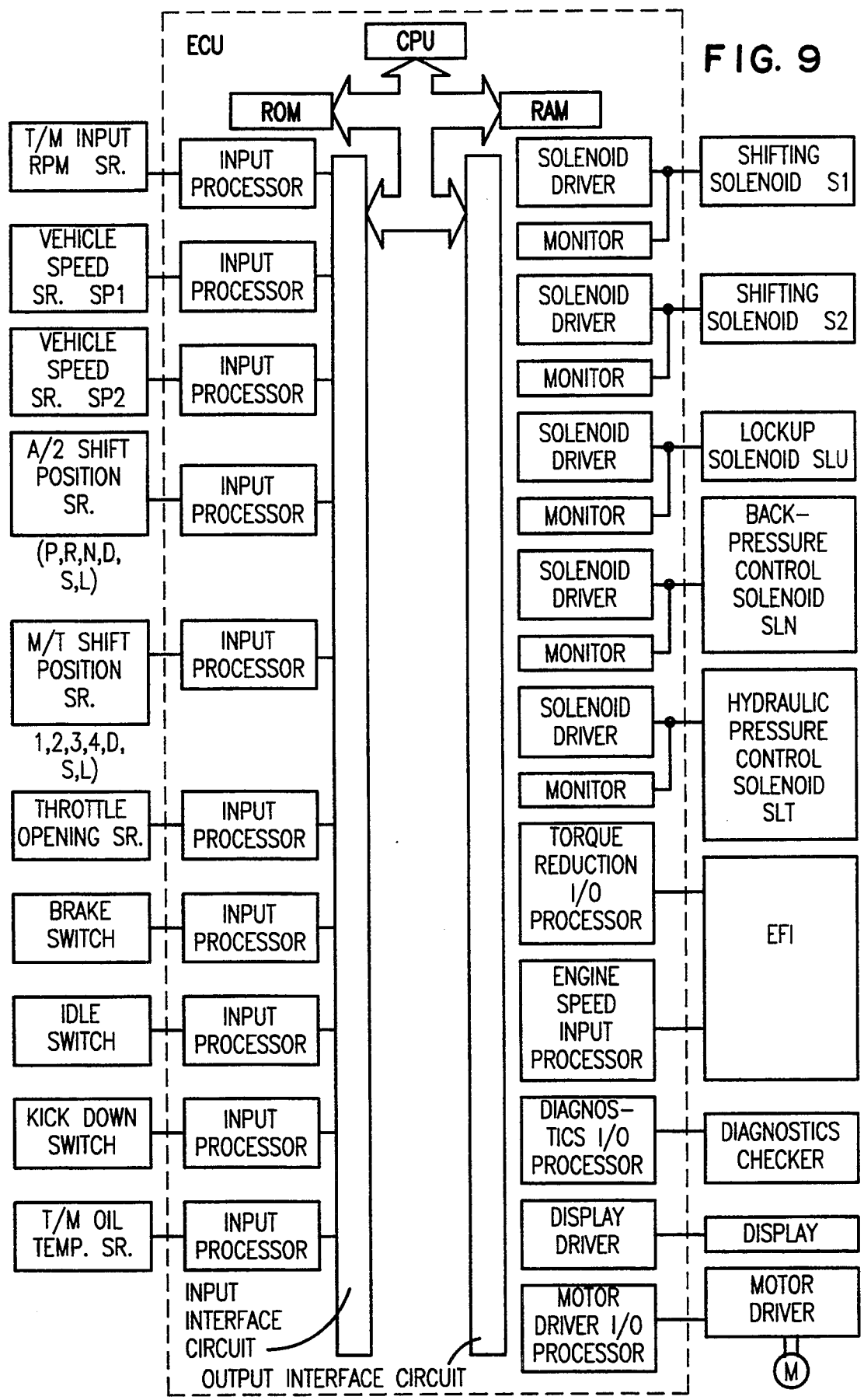
FIG. 9 is a block diagram of an electronic control unit.

The electronic control unit (ECU), which controls the solenoids of the hydraulic control system and the motor M shown in FIG. 4, will next be described with reference to the block diagram of FIG. 9. Sensor signals from various input detection devices are introduced into an input interface circuit via respective input processors. Subsequent to storage and processing, the data so obtained are output as control signals through an output interface circuit. The control signals are then fed through various drivers or processors so that shifting solenoids and the manual valve change-over motor are driven under control.

The input detection devices include a transmission input revolution speed sensor disposed in the transmission to detect rotation input to the transmission (corresponding to "NCO" in FIG. 7), a vehicle speed sensor for detecting rotation output from the transmission (corresponding to "SP1" in FIG. 7), another vehicle speed sensor for detecting rotation output from the transmission (corresponding to "SP2" in FIG. 7), an automatic transmission shift position sensor for detecting which position in the "I" gear shift pattern (for the automatic mode) has been selected (corresponding to the neutral start switch 9 in FIG. 2), an M/T shift position sensor arranged in the shift control unit to detect which position in the pattern for manual shifting has been selected (corresponding to the sensors S1 to S4, SD, SS and SL in FIG. 3), a throttle opening sensor (potentiometer) disposed in the engine to detect the degree opening of the throttle, a brake switch SW connected to the a brake pedal to detect braking, an idling switch IDL SW associated with the throttle opening sensor to detect full closure of the throttle valve, a kick down switch K/D SW connected to the accelerator pedal or the throttle opening sensor to detect full opening of the throttle valve and demand for kick down, and a transmission oil temperature sensor disposed in the transmission to detect the temperature of transmission oil. Input signals are received by the ECU from all these detection devices.

On the output side are solenoid drivers for generating predetermined voltages or currents to drive solenoids S1,S2 for changing over hydraulic pressure to operate the shift valves in accordance with the respective speed stages and also linear solenoids SLU,SLN,SLT for controlling lockup, back pressure and main line pressure. Also on the output side are monitors for self-diagnosis by checking operation of the associated solenoids and determining any failure, a torque reduction i/o processor for generating a signal to an engine controlling electronic control unit (EFI), to temporarily reduce torque produced by the engine, and a processor for inputting the speed of revolution of the engine to the engine controlling electronic control unit, both serving to reduce shock upon shifting, a diagnosis i/o processor for a diagnostics checker which outputs the results of self-diagnostics upon failure of the electronic control unit (ECU), a display driver for a display which shows the state of the transmission, and a motor driver i/o processor for outputting a drive signal to a motor driver to drive the manual valve change-over motor M.

Figure 10:
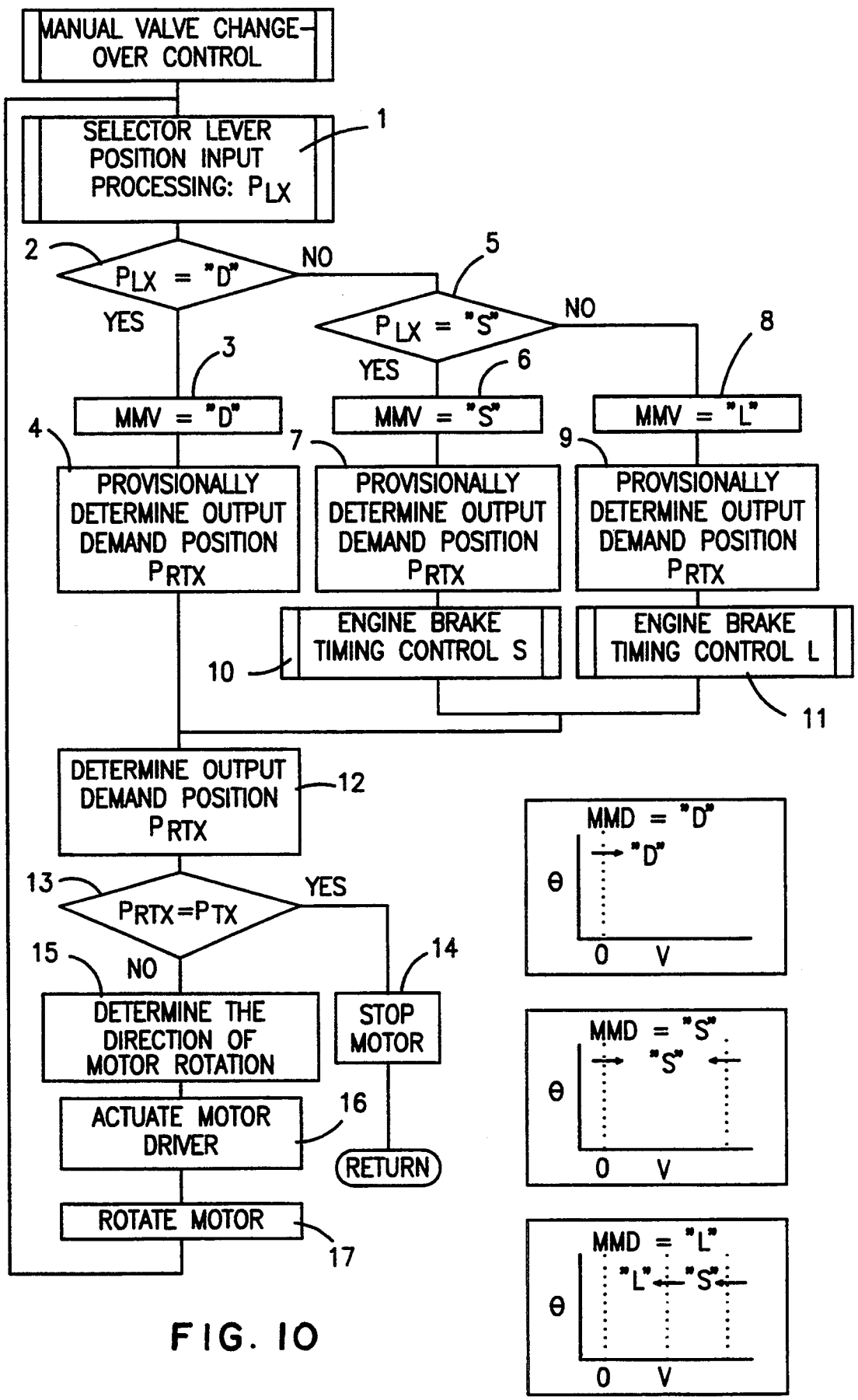
FIG. 10 shows a flow diagram for control of change-over of a manual valve and maps employed for the control.

FIG. 10 illustrates control of the manual valve change-over motor M in accordance with the position of the selector lever. Step 1 is a sub-routine for determining the position of the manual valve, that position corresponding to a shift position ("D", "S" or "L", or "1", "2", "3" or "4") selected by a driver, in accordance with a signal from the position sensor arranged at the shift position so selected. For example, assume that the gear shift pattern is the conventional "I" gear shift pattern. When the selector lever is in the position for the "D" range, its position is subjected to input processing as $P_{LX}=$"D". When the selector lever is in the "S" range or "L" range, its position is subjected to input processing as $P_{LX}=$"S" or $P_{LX}=$"L". When the "H" gear shift pattern is employed for manual shifting, the position of the selector lever is subjected to input processing as $P_{LX}=$"L", $P_{LX}=$"S" $P_{LX}=$"S" or $P_{LX}=$"D" in correspondence to the position "1", "2", "3" or "4".

In Step 2, it is determined whether the position subjected to input processing in the sub-routine of Step 1 is $P_{LX}=$"D". If $P_{LX}=$"D", data for "D" are read in the manual valve change-over map MMV and, in Step 4, an output demand position is provisionally determined from the relationship between vehicle speed (V) and throttle opening (O) in accordance with the map data of MMV=$"D"$.

If $P_{LX}$ is not determined to be "D" ($P_{LX}=$"D") in Step 2, it is then determined in Step 5 whether $P_{LX}=$"S" or not. If $P_{LX}=$"S", data for "S" are read in the map MMV in Step 6 as in Step 3 and Step 4 and, in Step 7, the output demand position is provisionally determined. Unless $P_{LX}=$"S" in Step 5, it is determined that $P_{LX}=$"L". Data are then read as MMV=$"L"$ in Step 8 and the output demand position is provisionally determined in Step 9. Where $P_{LX}=$"S" or $P_{LX}=$"L", the routine proceeds through a sub-routine in Step 10 or Step 11 so that an engine brake is applied. Where $P_{LX}=$"D", the routine proceeds through Step 4. The final output demand position is then determined in Step 12.

The output demand position and the position of the manual valve are compared in Step 13. Unless they conform with each other, the direction of rotation of the manual valve change-over motor M is determined in Step 15, the motor driver is actuated in Step 16, and, in step 17, the motor M is then allowed to rotate until their positions become the same. As soon as both the positions conform with each other, the drive of the motor is stopped in Step 14.

The construction and operation of each element of an embodiment according to this invention have been described. A description will hereinafter be made of the overall operation of the illustrated embodiment. FIGS. 11(A) to 11(E) illustrate operation of the power unit 3 by showing the respective rotation positions of the rotor stopper 44 in relation to the corresponding shift positions of the outer lever 24. FIG. 11(A) shows the positional relationship of members in the power unit 3 when the outer lever 24 has been driven to the "P" position. FIG. 11(B) shows the positional relationship of the members when the outer lever 24 has been driven to the "N" position. FIG. 11(C) shows the positional relationship of the members when the outer lever 24 has been driven to the position to the transitional state. FIG. 11(D) shows the positional relationship of the members when the outer lever 24 is in the "D" position, and FIG. 11(E) shows the positional relationship of the members when the manual valve 50 has been driven to the "S" position by the motor M.

Figure 12A:
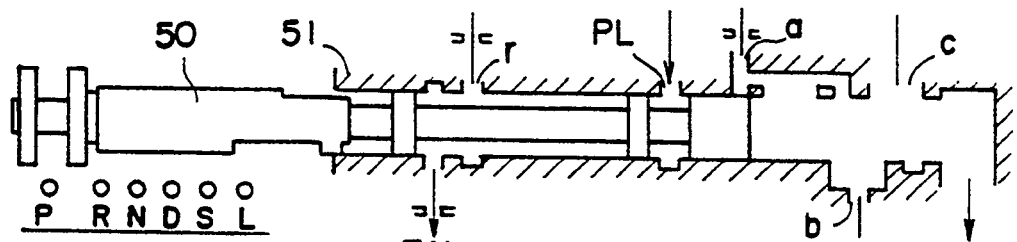
FIGS. 12(A) to 12(E) depict change-over operation of the manual valve.
Figure 12B:
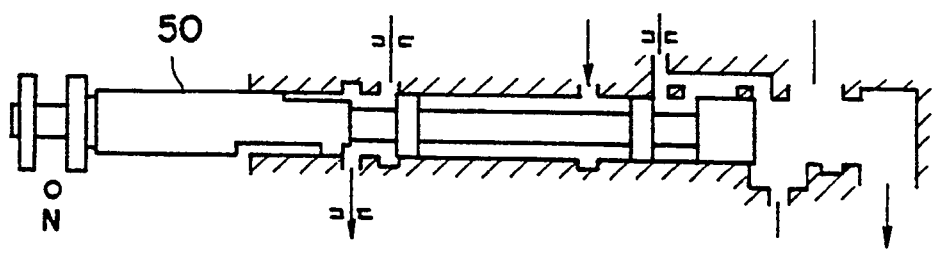

When the outer lever is in the "P" position as illustrated in FIG. 11((A1–A3), the manual valve 5 is in the "P" position as depicted in FIG. 12(A). When the selector lever 21 is moved from this position, namely, from "P" to "R" and then from "R" to "N" along the gear shift pattern, the outer lever 24 is turned and displaced via the control arm 22 and the control rod 23, as already described above with reference to FIG. 2. When the outer lever 24 turns to the "N" position, the motor casing 30 also turns integrally therewith as shown in FIGS. 11B1, 11B2. As the connecting/disconnecting mechanism is in a connecting state, the rotor stopper 44 and the manual shift 25 also turn together with the outer lever 24 so that the manual valve 50 moves to the "N" position depicted in FIG. 12(B). Although a description is omitted, it should be evident that stopping of the outer lever 24 at the "R" position results in holding of the manual valve 50 at the "R" position. When the selector lever 21 is moved in the opposite direction from "N" to "R" and then from "R" to "P" the manual valve 50 is then changed over to the corresponding positions.

When the outer lever 24 reaches the position of the transition state shown in FIGS. 11C1 to 11C3, the turning motion of the motor casing 30 is prevented by the case-side stopper 101 so that the inner ball 43 is aligned with the case-side, ball-fixing recess 100. When the outer lever 24 further turns clockwise from this state and reaches the "D" position shown in FIGS. 11D1 to 11D3, the outer ball 42 rides on the inner wall of the outer lever 24 from the outer-lever-side, ball-fixing recess 240 so that the spacer 41 and the inner ball 43 are caused to move inwardly and the inner ball 43 is fitted in the case-side, ball-fixing recess 100. Since the inward movement of the spacer 41 results in an inward movement of the stopper pin 410 provided integrally with the spacer 41, the stopper pin 410 is released from the engaging portion 440 of the rotor stopper 44. The connecting/disconnecting mechanism is therefore brought into a cut-off state, whereby the outer lever 24 and the manual shaft 25 are disconnected from each other.

Figure 12C:
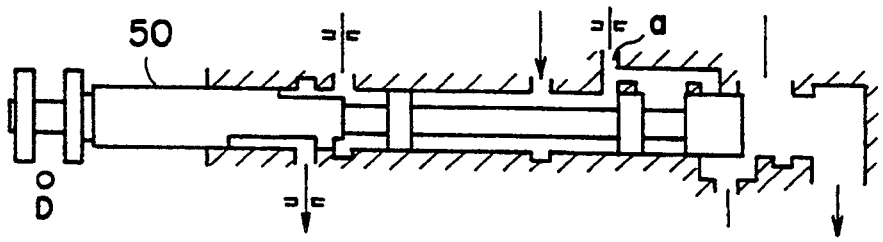
Figure 12D:
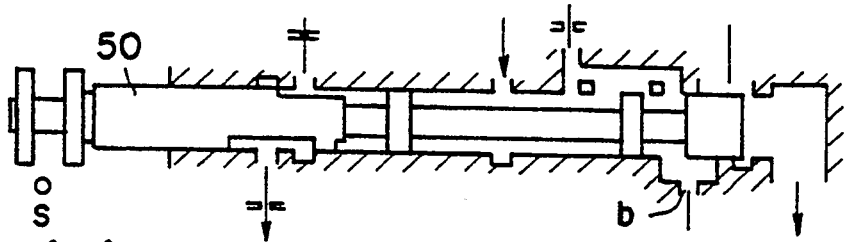
Figure 12E:
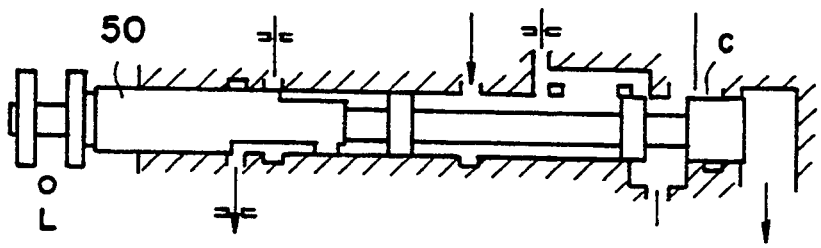

If the "D" position is selected by the selector lever 21 in FIG. 3, however, a signal from the position sensor $S_D$ is inputted as $P_{LX}=$"D" to the electronic control unit (ECU) and, following the manual valve change-over control flow described above, the motor M is controlled and rotated in the order of Steps 1–3, Steps 12 and 13 and Steps 15–17. The manual valve 50 is hence brought into the "D" position as illustrated in FIG. 12(C).

When the "S" position or the "L" position is selected by the selector lever 21, the manual valve 50 is controlled primarily by the motor M in accordance with the manual valve change-over control flow, as in the selection of the "D" position by the selector lever 21, because the mechanical connection between the outer lever 24 and the manual shaft 25 has already been cut-off. When the "S" position is selected by the selector lever 21, the manual shaft 25 is turned by rotation of the motor M so that the rotor stopper 44 integral with the manual shaft 25 is turned to the "S" position. This state is illustrated in FIGS. 11E1 and 11E2. The manual valve 50 moves to the "S" position shown in FIG. 12(D).

Operation of the selector lever 21 from the "1st" position to the "4th" position along the "H" gear shift pattern will now be described. When the "1st" position is selected by the selector lever 21, a corresponding position signal is inputted from the sensor S1 to the electronic control unit (ECU). As a result, the position signal is treated as $P_{LX}=$"L" to input processing in Step 1 of the control flow. The routine then proceeds successively through Steps 2, 5, 8, 9, 11–13 and 15–17 and the motor M is controlled and rotated until the manual valve 50 reaches the "L" position depicted in FIG. 12(E). As soon as the "L" position is reached, the rotation of the motor M is stopped in Step 14.

When the "2nd" position is selected by the shift lever 21, a corresponding position signal is inputted from the sensor S2 to the electronic control unit (ECU) and is set as $P_{LX}=$"S" for input processing in Step 1. The routine then proceeds through Steps 2, 5–7, 10, 12, 13 and 15–17 and the motor M is controlled and rotated until the manual valve 50 is brought into the "S" position illustrated in FIG. 12(D). As soon as the "S" position is reached, the rotation of the motor M is stopped in step 14.

When the "3rd" position is selected by the selector lever 21, a corresponding position signal is inputted from the sensor S3 to the electronic control unit (ECU) and is treated as $P_{LX}=$"S" to input processing in step 1. The motor M is then controlled and rotated as in the selection of the "2nd" position by the selector lever 21, so that the manual valve 50 remains in the "S" position.

When the "4th" position is finally selected by the selector lever 21, a corresponding position signal is inputted from the sensor S4 to the electronic control unit (ECU) and is treated as $P_{LX}=$"D" in input processing in Step 1. The motor M is then controlled and rotated as in the selection of the "D" position by the selector lever 21 so that the manual valve 50 retains the "D" position shown in FIG. 12(C).

When the selector lever 21 is in any one of the positions "P", "R" and "N" as described above, the connecting/disconnecting mechanism is in the connected state so that a rotational displacement of the selector lever 21 is converted to a linear displacement of the manual valve 50 via the mechanical transmission means, that is, the control arm 22, the control rod 23, the outer lever 24, the motor casing 30, the stopper pin 410, the rotor stopper 44 and the manual shaft 25. When the selector lever 21 is in any one of the "D", "S", "L", and "1st" to "4th" positions on the other hand, the connecting/disconnecting mechanism is in the cut-off state so that the manual valve 50 is controlled by the motor M to move to the position corresponding to the position of the selector lever 21. Even if the motor should run away, in other words, should run out of control in the above control of the motor M, the drive range of the motor M is still mechanically limited to the range "D", "S" and "L" because the overstroke-preventing pin 441 depicted in FIG. 6 can move only within the range of the groove 302 formed in the motor casing 30.

The present invention has been described above on the basis of the one embodiment. Needless to say, the present invention is not limited to the disclosed details of the embodiment but can be practiced with various modifications of the specific construction of its details within the scope of the clams. For example, while the combined gear shift pattern of the "I" and "H" gear shift patterns has been described, the present invention is not limited to this pattern.

What is claimed is:

1. A shift control system for selectively providing either automatic range shifting or manual shifting of an automatic transmission, by linear movement of a manual valve of a shift controller, said shift control system comprising:
   an electric motor having a rotatable output shaft;
   linkage means for converting the turning of said output shaft into linear movement of the manual valve;
   means for operating said electrical motor responsive to shift signals to effect said automatic range shifting;
   a manual shift lever;
   manual shift lever guide means defining a plurality of shift positions including a first portion for the automatic range shifting and a second portion for the manual shifting;
   manual shift lever linkage means connecting said manual shift lever to said output shaft for turning said output shaft responsive to movement of said manual shift lever; and
   a connecting/disconnecting mechanism for connecting said manual shift lever linkage means to said output shaft with said manual shift lever in one or more shift positions in said first portion of said guide means and for disconnecting said manual lever linkage means from said output shaft in any of the remaining shift positions.

2. The shift control system of claim 1, wherein said connecting/disconnecting mechanism is at said operating force transmitting position when said automatic transmission is in a "P", "R" or "N" range and is in said operating force cut-off position when said automatic transmission is in a "D" range and in manual shift positions for "1st", "2nd", "3rd" and "4th" speeds.

3. A shift control system for operating a manual valve of an automatic transmission, mounted within a transmission case, to perform an automatic range shift or a manual shift of the automatic transmission, comprising:
   a selector lever operable by a driver for movement to a selected one of a plurality of lever shift positions;
   an outer lever connected to said selector lever and mounted for rotation responsive to movement of said selector lever;
   a manual shaft connected to the manual valve and selectively connectable to said selector lever, for turning responsive to the movement of said selector lever;
   a connecting/disconnecting mechanism for selectively connecting or disconnecting said outer lever and said manual shaft;
   a power unit for turning said manual shaft when disconnected from said outer lever;
   sensors for detecting the selected shift position of said selector lever; and
   an electronic control unit for actuating said power unit in response to a signal from said sensors;
   said power unit comprising a power unit casing, a rotor mounted within said power unit casing and fixed to said manual shaft for rotation therewith, and a stator arranged inside of and fixed to said power unit casing, for rotating said rotor in response to a signal from said electronic control unit; and
   said connecting/disconnecting mechanism being movable by said selector lever between an operating force transmitting position, where said connecting/disconnecting mechanism connects said manual shaft and said outer lever to each other through said power unit casing whereby said outer lever, said manual shaft and said power unit casing rotate together, relative to the, transmission case, responsive to movement of said selector lever, and an operating force cut-off position where said manual shaft and said outer lever are disconnected from each other and said power unit casing is locked to the transmission case through said connecting/disconnecting mechanism.

4. The shift control system of claim 3, wherein said connecting/disconnecting mechanism comprises:
   a hole formed in said power unit casing parallel to said manual shaft;
   a first detent recess formed in said outer lever at a position facing said hole;
   a second detent recess formed in the transmission case at a position facing said hole;
   a lock member slidably mounted in said hole;
   connecting means for connecting said lock member and said manual shaft to each other;
   a first stopper provided on said power unit casing and adapted to limit turning motion of said outer lever relative to said power unit casing; and
   a second stopper provided on the transmission case and adapted to limit turning motion of said power unit casing relative to the transmission case;
   said connecting/disconnecting mechanism moving from said operating force cut-off position to said operating force transmitting position upon engagement of said outer lever with said first stopper by movement of said selector lever, whereby one end portion of said lock member moves into said first detent recess to connect said outer lever and said power unit casing for rotation together, with an opposite end portion of said lock member disengaged from said second detent recess and said lock member and said manual shaft connected by said connecting means; and
   said connecting/disconnecting mechanism moving from said operating force transmitting position to said operating force cut-off position upon engagement of said power unit casing with said second stopper by movement of said selector lever, whereby said opposite end portion of said lock member moves into said second detent recess to fix said power unit casing to said transmission case, with said one end portion of said lock member disengaged from said first detent recess, the connection between said outer lever and said power unit casing is released, and the connection between said lock member and said manual shaft by said connecting means is released.

5. The shift control system of claim 4, wherein said connecting means comprises:

a rotor stopper fixed to said manual shaft and extending between a pair of stops defining limits for rotation of said manual shaft; and a stopper pin connected to said lock member for engagement with said rotor stopper in said operating force transmitting position and disengaged from said rotor stopper in said operating force cut-off position.

6. The shift control system of claim 5, wherein ends of a slot in said power unit casing form said pair of stops.

7. The shift control system of claim 4, wherein said first and second detent recesses have a conical shape.

8. The shift control system of claim 5, wherein said first and second detent recesses have a conical shape.

9. The shift control system of claim 4, wherein said lock member comprises a spacer rod, and a first ball and a second ball arranged at opposite ends of said spacer rod and movable into and out of said first and second detent recesses, respectively.

10. The shift control system of claim 4, further comprising a rotor stopper fixed to said manual shaft and wherein said power unit casing is provided with a third stopper for limiting turning motion of said rotor stopper relative to said power unit casing.

11. The shift control system of claim 3, wherein said connecting/disconnecting mechanism is at said operating force transmitting position when said automatic transmission is in a "P", "R" or "N" range and is in said operating force cut-off position when said automatic transmission is in a "D", "S" or "L" range.

12. The shift control system of claim 3, wherein said connecting/disconnecting mechanism is at said operating force transmitting position when said automatic transmission is in a "P", "R" or "N" range and is in said operating force cut-off position when said automatic transmission is in a "D" range and in manual shift positions for "1st", "2nd", "3rd" and "4th" speeds.

* * * * *